United States Patent
Krismanic et al.

(10) Patent No.: US 10,065,661 B2
(45) Date of Patent: Sep. 4, 2018

(54) SAND DISPENSER FOR A RAIL VEHICLE AND METHOD FOR PROVIDING SAND FOR A RAIL VEHICLE

(71) Applicant: KNORR-BREMSE SYSTEME FÜR SCHIENENFAHRZEUGE GMBH, Munich (DE)

(72) Inventors: Georg Krismanic, Vienna (AT); Florian Hoesch, Vienna (AT); Albert Schneider, Vienna (AT)

(73) Assignee: KNORR-BREMSE SYSTEME FUR SCHIENENFAHRZEUGE GMBH (DE)

( * ) Notice: Subject to any disclaimer, the term of this patent is extended or adjusted under 35 U.S.C. 154(b) by 224 days.

(21) Appl. No.: 15/026,030

(22) PCT Filed: Sep. 25, 2014

(86) PCT No.: PCT/EP2014/070440
§ 371 (c)(1),
(2) Date: Mar. 30, 2016

(87) PCT Pub. No.: WO2015/044244
PCT Pub. Date: Apr. 2, 2015

(65) Prior Publication Data
US 2016/0244074 A1 Aug. 25, 2016

(30) Foreign Application Priority Data
Sep. 30, 2013 (DE) .................. 10 2013 016 167

(51) Int. Cl.
*B61C 15/10* (2006.01)
*B60B 39/08* (2006.01)

(52) U.S. Cl.
CPC ............ *B61C 15/102* (2013.01); *B60B 39/08* (2013.01); *B61C 15/10* (2013.01)

(58) Field of Classification Search
CPC ...... B60B 39/00; B60B 39/021; B60B 39/025; B60B 39/04; B61C 15/00; B61C 15/08;
(Continued)

(56) References Cited

U.S. PATENT DOCUMENTS 8,336,926 B2    12/2012  Tober et al.

FOREIGN PATENT DOCUMENTS

| CN | 202138383 U | 2/2012 |
| CN | 202641699 U | 1/2013 |

(Continued)

OTHER PUBLICATIONS

German Examination report dated May 26, 2014.
(Continued)

*Primary Examiner* — Robert J McCarry, Jr.
(74) *Attorney, Agent, or Firm* — Barnes & Thornburg LLP (57) ABSTRACT

The present invention relates to a sand dispenser for a rail vehicle, wherein the sand dispenser comprises a metering device, a delivery device and an uncoupling device. The metering device is designed to pneumatically meter a desired quantity of sand using a metering air flow. The delivery device is designed to pneumatically deliver the quantity of sand to at least one scattering site using a delivery air flow. The uncoupling device is designed to pneumatically uncouple the metering device and the delivery device, wherein the uncoupling device is designed to provide a compensating air flow for compensating a difference between an output air flow of the metering device and an input air flow of the delivery device.

21 Claims, 4 Drawing Sheets

(58) Field of Classification Search
CPC ..... B61C 15/10; B61C 15/102; B61C 15/105; B61C 15/107
See application file for complete search history.

(56) References Cited

FOREIGN PATENT DOCUMENTS

| | | |
|---|---|---|
| DE | 2725639 A1 | 12/1978 |
| DE | 3410409 A1 | 9/1985 |
| DE | 10318289 A1 | 11/2001 |
| DE | 20217390 U1 | 1/2003 |
| DE | 10333637 A1 | 2/2005 |
| DE | 102011113070 A1 | 3/2013 |
| EP | 0016471 A1 | 10/1980 |
| EP | 1418108 A1 * | 5/2004 ........... B60B 39/086 |
| EP | 1418108 A1 | 5/2004 |
| EP | 1470981 | 7/2008 |
| EP | 2311653 A1 | 4/2011 |
| WO | 2008061650 A1 | 5/2008 |
| WO | 2008064747 A1 | 6/2008 |

OTHER PUBLICATIONS

Search report for International Patent Application No. PCT/EP2014/070440; dated Dec. 11, 2015.
Chinese Office Action for corresponding application 201480061425.1 dated Mar. 31, 2017.

* cited by examiner

SAND DISPENSER FOR A RAIL VEHICLE AND METHOD FOR PROVIDING SAND FOR A RAIL VEHICLE

PRIORITY CLAIM

This patent application is a U.S. National Phase of International Patent Application No. PCT/EP2014/070440, filed 25 Sep. 2014, which claims priority to German Patent Application No. 102013016167.3, filed 30 Sep. 2013 the disclosure of which are incorporated herein by reference in their entirety.

FIELD

The disclosed embodiments relate to a sand dispenser for a rail vehicle and a method for providing sand for a rail vehicle.

BACKGROUND

Sand for increasing a friction coefficient between the wheel and rail in a rail vehicle can be transported by an air flow in a hose or a pipe. To transport a predetermined quantity of sand under different conditions, different air quantities are necessary. The different air quantities can influence a metering of the quantity.

SUMMARY

Disclosed embodiments provide an improved sand dispenser for a rail vehicle and an improved method for providing sand for a rail vehicle. A metering operation for a desired quantity of sand can be decoupled from a conveying operation to an intended location of the sand. The decoupling can prevent interaction between the metering operation by a metering member and the conveying operation by a conveying member. If the metering operation and the conveying operation are operated by compressed air, a pressure compensation and alternatively or additionally an air quantity compensation can be carried out between the metering member and the conveying member for decoupling. It is thereby possible to compensate for an excess pressure or an excess of air or a reduced pressure or a lack of air between the metering member and the conveying member.

BRIEF DESCRIPTION OF FIGURES

Exemplary embodiments will be discussed in greater detail in the following text together with the figures, in which.

DETAILED DESCRIPTION OF THE DISCLOSED EMBODIMENTS

A sand dispenser for a rail vehicle comprises the following features: a metering device for pneumatically metering a desired sand quantity using a metering air flow; a conveying device for pneumatically conveying the sand quantity to at least one scattering location using a conveying air flow; and a decoupling device for pneumatically decoupling the metering device and the conveying device, wherein the decoupling device is constructed to provide a compensation air flow for compensating for a difference between an outlet air flow of the metering device and an inlet air flow of the conveying device.

A method for providing sand for a rail vehicle comprises metering a desired sand quantity using a metering air flow and/or a metering air pressure, conveying the sand quantity to at least one scattering location using a conveying air flow and/or a conveying air pressure, and decoupling an outlet air flow of the metering device and an inlet air flow of the conveying device using a compensation air flow for compensating for a difference between the outlet air flow and the inlet air flow.

The term "sand dispenser" may be understood to mean a device for providing sand in the region of at least one contact location between a wheel of the rail vehicle and the rail. The region of the contact location may be referred to as the scattering location. A metering air flow may provide necessary energy for metering the sand quantity. The metering air flow may be provided as compressed air. The metering air flow may be provided at a high pressure level. The metering air flow may draw a relatively large air quantity in quantitative terms and the sand quantity at a low pressure level through the metering device. A conveying air flow may provide necessary energy for conveying the sand quantity to the scattering location. The conveying air flow may be provided as compressed air. The conveying air flow may be provided at a high pressure level. The conveying air flow may draw a relatively large air quantity in quantitative terms and the sand quantity at a low pressure level through the conveying device. An outlet air flow of the metering device may be a combined air flow from the metering air flow and air which is drawn by the metering device. An inlet air flow of the conveying device may be an air flow which is drawn by the conveying air flow through the conveying device.

The decoupling device may have a pressure compensation chamber for coupling the compensation air flow. The pressure compensation chamber may be arranged in a connection line between the metering device and the conveying device. The pressure compensation chamber may be a hollow space, in which the air drawn by the metering air flow and the sand are introduced. The sand can be transported approximately linearly through the pressure compensation chamber as a result of the kinetic energy thereof, while the air takes up the ambient pressure prevailing in the pressure compensation chamber. The sand and the air from the pressure compensation chamber can be drawn in by the conveying device using the conveying air flow.

The decoupling device may have a base which is constructed obliquely in the direction toward the conveying device to prevent sand deposits in the decoupling device. As a result of the oblique base, there is produced a funnel effect which uses gravitational force to transport the sand to the conveying device in the fitted position.

The decoupling device may have at least one compensation air flow opening with respect to an environment for the compensation air flow. A compensation air flow opening may be an opening of a compensation air flow channel. The compensation air flow channel may direct the compensation air flow from or to the decoupling device.

The metering device and alternatively or additionally the conveying device may have an ejector having at least one ejector hole for providing the metering air flow and alternatively or additionally the conveying air flow. An ejector may be a nozzle, with respect to the axis of which the ejector hole is arranged in an oblique manner. The nozzle may have a slight or no cross-sectional tapering. In this instance, the direction of the inclination in a state projected onto the nozzle defines a conveying direction of the ejector.

The metering device and alternatively or additionally the conveying device may have an injector having at least one injector nozzle for providing the metering air flow and alternatively or additionally the conveying air flow. An injector may be a nozzle having a pronounced cross-sectional tapering. In this instance, the cross-sectional tapering forms a funnel-like collector nozzle up to the cross-sectional tapering and a diffuser adjacent to the cross-sectional tapering. At the narrowest location of the cross-sectional tapering there is a diffuser neck. The injector nozzle is orientated toward the cross-sectional tapering and the metering air flow or the conveying air flow draw(s) air and sand in the collector nozzle. The injector has a high degree of efficiency. The injector is not very susceptible to contamination.

The metering device and alternatively or additionally the conveying device may have an air amplifier having at least one annular gap for providing the metering air flow and alternatively or additionally the conveying air flow. An air amplifier may be a nozzle having a flow-optimized cross-sectional tapering. The annular gap is arranged upstream of the cross-sectional tapering in the conveying direction and is constructed to provide an approximately laminar flow over the wall of the nozzle. The laminar flow draws air and sand through the nozzle. As a result of the laminar flow, the sand is swirled only slightly and is discharged from the air amplifier as an orientated stream.

The metering device and alternatively or additionally the conveying device may have a Venturi nozzle having at least one discharge pipe for supplying the sand quantity. The Venturi nozzle may be orientated horizontally in the fitted position. As a result of a Venturi nozzle, the sand can be redirected laterally using the metering air flow or the conveying air flow. A manifold can thereby be dispensed with.

The metering device may have at least one secondary air flow opening to an environment. The secondary air flow opening may be arranged adjacent to an inlet opening of the metering device. The secondary air flow opening may be constructed to provide a secondary air flow for fluidizing sand in the region of the inlet opening when the metering air flow flows through the metering device. A secondary air flow may be the air drawn by the metering device from the metering air flow. The secondary air flow opening may be the opening of a secondary air flow channel.

As a result of the secondary air flow opening, the secondary air flow can be drawn in with less resistance. The sand container can then be constructed in a sealed manner.

The secondary air flow opening may be arranged obliquely. The secondary air opening may be closed by a porous medium. The porous medium may be a sintered material.

The secondary air flow opening may be constructed in the region of the inlet opening as an oblique hole. The introduction of sand is prevented by the oblique hole.

The metering device may have an intake above an inlet opening. The intake may be constructed to prevent the introduction of sand into the metering device in the absence of the metering air flow. An intake may be a cover. The intake may form a gap or a channel, through which the drawn air and the drawn sand can be drawn in. The sand can be safely stored in the sand container as a result of the intake.

The metering device may have a dispensing funnel, through which the sand container can be emptied without any residue by the metering device. As a result of the funnel, the sand is transported to the metering device by gravitational force.

The metering device may have holes which lead a drying air flow into the sand container. The holes can be constructed in an oblique downward direction. As a result of the inclination, the introduction of sand into the holes is prevented.

The metering device may have an opening which is closed by a porous element. The porous element may be a sintered plate. The drying air flow may be directed into the sand container through the porous element.

The drying air flow may be heated and/or dried.

The sand supply in the sand container may be dried by the drying air flow.

The sand dispenser may have a heating member which has a heating element and a heat transmission element, wherein the heating element is constructed to convert electrical energy into heat and the heat transmission element is constructed to transmit the heat from the heating element to a housing of the sand dispenser and a drying air flow. The sand in the sand container can be dried by the heating member. Furthermore, the sand dispenser can be heated in order, for example, to prevent icing.

Holes for the drying air flow can be constructed as oblique holes in the dispensing funnel. No sand can be introduced into the holes by the oblique holes.

The housing may be constructed in multiple portions, wherein there is arranged in a first housing portion a groove which extends round the metering device and in which the heating member is arranged. The groove may be closed by a second housing portion. The heating member is well protected in the groove.

The groove may have a polygonal extent. The groove may have a hexagonal extent. The extent of the groove may be arranged with spacing from other construction elements as a result of the polygonal nature. For example, the groove may thus extend with spacing from connection elements, such as screws or channels.

The groove may have a depth and the heating member may have a height in the relaxed state, wherein the height is greater than the depth and the heating member is compressed by the second housing portion in the fitted state. As a result of the compression, it is possible to achieve a good sealing with respect to the housing and/or good heat transmission with respect to the housing.

The heat transmission element may have a structure for providing a heat transmission face with respect to the drying air flow and a contact face with respect to the housing, wherein the heat transmission face and the contact face are in a predetermined surface-area ratio. The structure may be constructed as at least one rib and may provide a large heat transmission face. The contact face may be planar. The drying air may be heated effectively by the structure.

The rib may be constructed as a helix, through which the drying air flow flows. The drying air flow can have contact with the heat transmission face for a longer time as a result of the helix.

The heat transmission element may have a base member which comprises an elastomer material and which surrounds the heating element. An elastomer material is permanently resilient and adapts to the groove.

The elastomer material may be provided with at least one filler material, wherein the filler material is constructed to change a thermal conductivity of the elastomer material, in particular to increase or decrease it. The filler material may have thermally conductive properties. The filler material may have thermally insulating properties. The elastomer material can be adapted to different requirements as a result of the filler material.

The elastomer material may be provided at a heat transmission face with respect to the drying air flow with a filler material which is constructed to increase the thermal conductivity of the elastomer material. Alternatively or additionally, the elastomer material may be provided at a contact face with respect to the housing with a filler material which is constructed to reduce the thermal conductivity of the elastomer material. A thermal distribution between the housing and the drying air can thereby be shifted in favor of the drying air.

Figure 1:
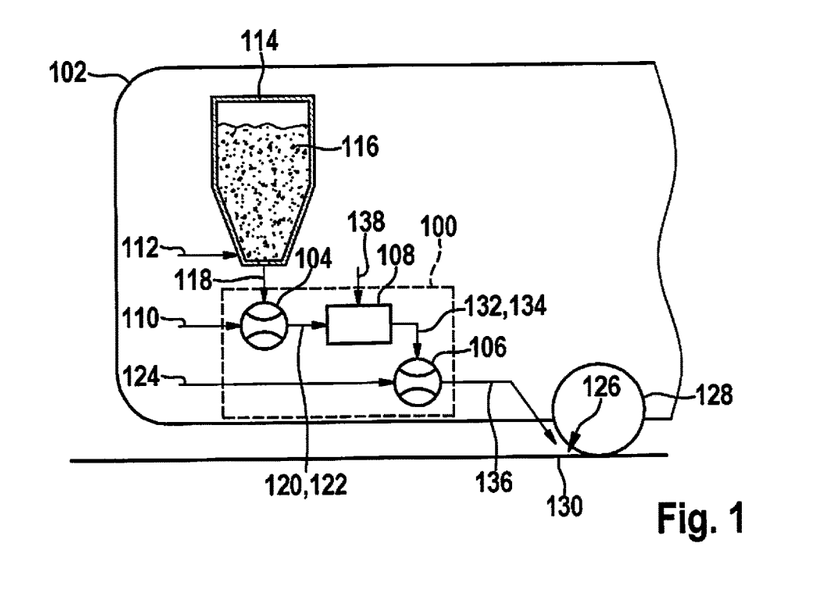
FIG. 1 is a block diagram of a sand dispenser according to an embodiment.

FIG. 1 is a block diagram of a sand dispenser 100 for a rail vehicle 102 according to a disclosed embodiment. The sand dispenser 100 has a metering device 104, a conveying device 106 and a decoupling device 108. The sand dispenser 100 is a component of the rail vehicle 102. The metering device 104 is constructed to pneumatically meter a desired sand quantity. To this end, the metering device 104 uses a metering air flow 110. If the metering air flow 110 flows through the metering device 104, a secondary air flow 112 is drawn along by a resultant reduced pressure in the metering device 104. The secondary air flow 112 is dependent on the metering air flow 110. The greater the metering air flow 110 is, the greater is the secondary air flow 112. The secondary air flow 112 flows through a sand container 114 with sand 116, where the sand 116 is at least partially fluidized by the secondary air flow 112 and the sand quantity is drawn along. The sand quantity mixes with the secondary air flow 112 to form a first two-phase flow 118 comprising sand 116 and air. The first two-phase flow 118 comprises with the secondary air flow 112 an inlet air flow of the metering device 104. The first two-phase flow 118 again mixes in the metering device 104 with the metering air flow 110 to form a second two-phase flow 120. The second two-phase flow 120 comprises with the secondary air flow 112 and the metering air flow 110 an outlet air flow 122 of the metering device. The outlet air flow 122 transports the metered sand quantity to the conveying device 106. The conveying device 106 is constructed to convey the sand quantity using a conveying air flow 124 pneumatically to at least one scattering location 126. The scattering location 126 is located on a wheel 128 of the rail vehicle 102. The scattering location 126 is connected to the sand dispenser 100 via a sand directing line. The sand 116 is used to increase the friction between the wheel 128 and the rail 130. If the conveying air flow 124 flows through the conveying device 106, a third two-phase flow 132 comprising sand 116 and air or an inlet air flow 134 of the conveying device 106 is drawn along by a resultant reduced pressure in the conveying device 106. The inlet air flow 134 is dependent on the conveying air flow 124. The greater the conveying air flow 124 is, the greater is the inlet air flow 134. The inlet air flow 134 and the conveying air flow 124 mix in the conveying device 106 to form an outlet air flow of the conveying device 106. The outlet air flow of the conveying device 106 is a fourth two-phase flow 136 comprising sand 116 and air. The outlet air flow transports the sand quantity to the scattering location 126.

The outlet air flow 122 of the metering device 104 is dependent on the metering air flow 110. The inlet air flow 134 of the conveying device 106 is dependent on the conveying air flow 124. The outlet air flow 122 and the inlet air flow 134 may have a difference while the sand quantity is identical. The decoupling device 108 is constructed to pneumatically compensate for the difference between the outlet air flow 122 of the metering device and the inlet air flow 134 of the conveying device. To that end, the decoupling device 108 provides a compensation air flow 138 for compensating for the difference. As a result, the decoupling device 108 decouples the metering device 104 from the conveying device 106.

FIG. 1 illustrates a pneumatic sand metering and conveying system 100. To improve the friction coefficient between the wheel 128 and the rail 130 in the case of rail vehicles 102, it is necessary under specific conditions to scatter sand 116 between the wheel 128 and rail 130. For this purpose, sand scattering systems 100 are installed in front of selected wheels 128 of the rail vehicles 102. The sand scattering systems 102 comprise the main components storage container 114, metering member 104, conveying member 106 and sand directing hose. In accordance with the respective installation situation in the vehicle 102, the extent of the sand directing hose may be very different. Consequently, there are also produced different pneumatic resistances to which the two-phase flow of sand/air is subjected in the sand directing hose and which bring about different pressure reductions in the sand directing hose between the start and end thereof. That pressure reduction has a retroaction on the function of the conveying member 106. The affected functions of the conveying member 106 are achievable sand conveying speed and maximum possible sand throughput. If a pneumatic conveying member 106 is simultaneously used as a pneumatic metering member 104, or if a pneumatic conveying member 106 and a pneumatic metering member 106 are fitted one behind the other, then the retroaction of the pressure reduction in the sand directing hose also has a retroaction on the metering member 104 and consequently on the sand conveying quantity.

As a result of the approach set out here, this retroaction on the sand conveying quantity is minimized and eliminated in the ideal case. In this instance, as little wear as possible by the highly abrasive sand is allowed.

The metering member 104 and conveying member 106 can be separated in such a manner that this retroaction is avoided by using different active principles for the metering member 104 and conveying member 106. In this instance, for example, mechanical piston metering members can be combined with pneumatic jet nozzle conveying members 106. Similarly, mechanical rotary valve metering members can be combined with pneumatic conveying members 106. As a result of the use of mechanically moving components, such as pistons and rotary valves, for the metering member, the abrasion between the mechanically moving component and the sand is very high.

There are set out a method and a device 100, wherein a pneumatic metering member 104 and a pneumatic conveying member 106 are pneumatically decoupled in an effective manner and consequently a retroaction to the sand conveying quantity can be minimized or eliminated. In this instance, the two-phase flow 118 represents the sand conveying quantity. The decoupling is achieved in that the two-phase flows 120, 134 inside a pressure compensation chamber are brought to ambient pressure by a compensation air flow opening with respect to the ambient air. The compensation air flow opening consequently allows a compensation air flow 138 which comprises the difference of the air proportion 122 of the two-phase flow 120, which is composed of the total of the metering air flow 110 and the secondary air flow 112, and the air proportion 134 of the two-phase flow 132.

Consequently, the two-phase flow 136 can be adjusted by the conveying air 124 without any influence of the two-phase flow 118 representing the sand conveying quantity or can be influenced by changing the extent of the sand directing hose.

There is thereby produced a purely pneumatic metering and conveying system 100 which does not have any moving components inside the metering and conveying system 100. In spite of the use of the purely pneumatic metering and conveying system 100 there is produced a decoupling of the metering member 104 and conveying member 106. There is further afforded the possibility of blowing residual sand out of the sand directing hose irrespective of the activation of the metering. Furthermore, the metering and conveying are independent of the sealing of the storage container 114.

Figure 2:
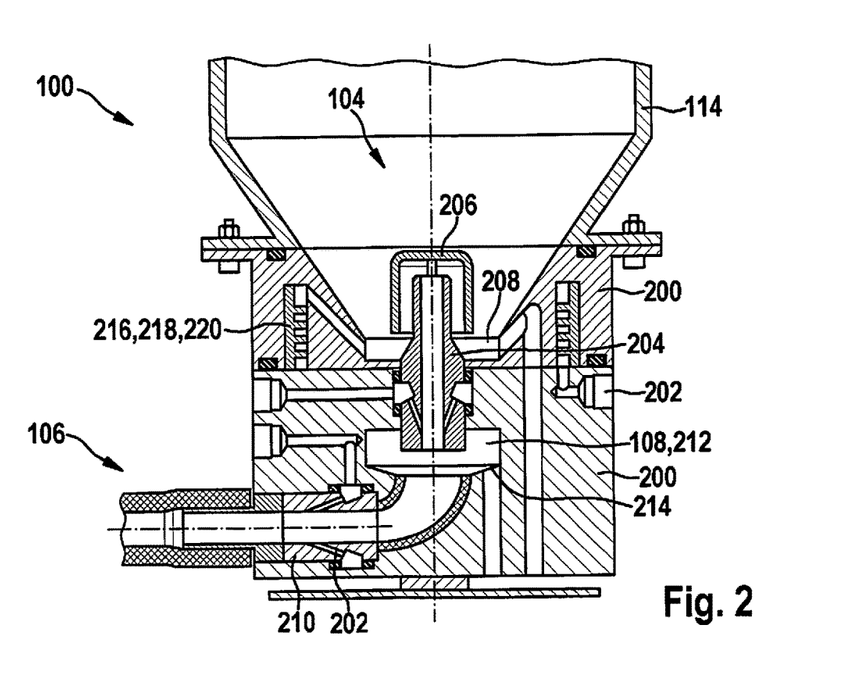
FIG. 2 illustrates a sand dispenser according to an embodiment.

FIG. 2 illustrates a sand dispenser 100 according to a disclosed embodiment. The sand dispenser 100 substantially corresponds to the sand dispenser in FIG. 1. The sand dispenser 100 is illustrated here in a fitted position so that the sand flows out of the sand container 114 as a result of gravitational force to the metering device 104. The sand dispenser 100 has in this instance a multi-component housing 200 which surrounds the metering device 104, the conveying device 106 and the decoupling device 108. The sand container 114 is flanged to the housing 200. The sand container 114 is a funnel at one end facing the sand dispenser 100. The metering device 104 is arranged at a tapering end of the funnel. In the embodiment illustrated, the metering device 104 and the conveying device 106 are constructed as ejectors each having at least two ejector holes 202 for providing the metering air flow or the conveying air flow. The ejectors have a structurally fixed conveying device. The ejectors each have an inlet opening and an outlet opening. The conveying direction of the ejector of the metering device 104 is orientated from the sand container 114 to the conveying device 106. The conveying direction of the ejector of the conveying device 106 is directed from the metering device 104 to the sand directing hose.

The ejector of the metering device 104 is constructed as a first pipe 204 which is orientated vertically in the fitted position. The first pipe 204 is inserted in the housing 200. The first pipe 204 projects into the sand container 114. As a result, the inlet opening of the metering device 104 is arranged higher in the fitted position than a lowest location of the sand container 114. At an outlet location from the housing 200, the pipe 204 has a conical tapering. An outer diameter of the pipe 204 is smaller in the region of the sand container 114 than in the housing 200. An inner diameter of the pipe 204 is constant. The ejector holes 202 are arranged obliquely to a center axis of the pipe 204 in a casing of the pipe 204. The ejector holes 202 are directed in the conveying direction. The ejector holes are connected to each other via a metering air flow channel which extends annularly around the first pipe 204. The metering air flow channel is arranged in the casing in this case. The metering air flow channel is connected to a metering air flow connection for the metering air flow. The metering air flow connection is arranged at an outer face of the housing 200. During operation, the metering air flow is pressed into the metering air flow channel from the metering air flow connection. In the metering air flow channel, the metering air flow is distributed uniformly over the ejector holes 202. The metering air flow flows through the ejector holes 202 into the first pipe 204 and draws the secondary air along in the conveying direction. The metering device 104 has an intake 206 above the inlet opening. The intake 206 is constructed to prevent the introduction of sand into the metering device 104 in the absence of the metering air flow. There is formed between the intake 206 and the thinner portion of the first pipe 204 an annular gap, through which the secondary air flow conveys the sand into the metering device 104 during operation counter to the gravitational force. The metering device 104 has at least one secondary air flow opening 208 with respect to the environment. The secondary air flow opening 208 is arranged adjacent to the inlet opening of the metering device 104. The secondary air flow opening 208 is constructed to provide the secondary air flow for fluidizing sand in the region of the inlet opening when the metering air flow flows through the metering device 104. A secondary air flow channel leads through the housing 200 to the secondary air flow opening 208. The secondary air flow channel extends perpendicularly through the housing 200 in the fitted position. In the region of the sand container 114, the secondary air flow channel has a bend and extends from there approximately parallel with a container wall of the funnel-like end of the sand container 114. The sand in the fitted position thereby cannot be introduced counter to the gravitational force into the secondary air flow channel. The secondary air flow opening 208 is arranged at the lowest location of the sand container 114. The secondary air flow opening 208 is arranged with little spacing from the first pipe 204. The secondary air flow channel is directed toward the first pipe 204. A mixing region, in which the sand is mixed or fluidized with the secondary air flow to form a first two-phase flow when the secondary air flows from the secondary air flow opening 208 into the gap, is arranged between the secondary air flow opening 208 and the gap between the intake 206 and the first pipe 204. As a result of the funnel-like shape of the sand container 114, the sand can subsequently slide out of the container by means of gravitational force into the mixing region. The first two-phase flow is transported through the metering device 104 and mixes in the metering device 104 with the metering air flow to form a second two-phase flow. A manifold is arranged between the metering device 104 and the conveying device 106 to laterally redirect the two-phase flow upstream of the conveying device 106 through 90 degrees.

The ejector of the conveying device 106 is constructed as a second pipe 210 which is orientated horizontally in the fitted position. The second pipe 210 is inserted in the housing 200. The ejector holes 202 are arranged, as in the metering device 104, obliquely relative to a center axis of the pipe 210 in a casing of the pipe 210. The ejector holes 202 are directed in the conveying direction. The ejector holes are connected to each other via a conveying air flow channel which extends annularly around the second pipe 210. The conveying air flow channel is arranged in the casing in this case. The conveying air flow channel is connected to a conveying air flow connection for the conveying air flow. The conveying air flow connection is arranged at an outer face of the housing 200. During operation, the conveying air flow is pressed from the conveying air flow connection into the conveying air flow channel. In the conveying air flow channel, the conveying air flow is uniformly distributed over the ejector holes 202. The conveying air flow flows through the ejector holes 202 and draws along in the second pipe 210 a third two-phase flow from the drawn sand from the metering device 104 and air in the conveying direction into the sand directing hose. In the second pipe 210, the conveying air flow mixes with the third two-phase flow to form a fourth two-phase flow. The second pipe 210 has a greater inner diameter than the first pipe 204. In a state adjoining the second pipe 210, the conveying device 106 has a connection flange for the sand directing hose which projects beyond the outer face of the housing 200.

The decoupling device 108 is arranged between the metering device 104 and the conveying device 106. The decoupling device 108 has a pressure compensation chamber 212 for coupling the compensation air flow. The pressure compensation chamber 212 is arranged in a connection line between the metering device 104 and the conveying device 106. The pressure compensation chamber 212 has a base which is constructed to be oblique in the direction toward the conveying device 106. The oblique base is constructed as a funnel with respect to the connection line. The base is constructed to prevent sand deposits in the decoupling device 108. Sand deposited slides through the funnel in the direction of the conveying device 106. The pressure compensation chamber 212 has a compensation air flow opening 214 with respect to the environment for the compensation air flow. The compensation air flow opening 214 is connected to the environment via a compensation air flow channel through the housing 200. Therefore, ambient pressure is present in the pressure compensation chamber 212. The compensation air flow channel extends in the fitted position perpendicularly through the housing 200. The openings of the secondary air flow channel and the compensation air flow channel are protected from contamination, for example, by water and/or solid materials, by a plate which is arranged upstream.

If the outlet air flow which represents an air proportion of the second two-phase flow from the metering device 104 and the inlet air flow which represents the air proportion of the third two-phase flow into the conveying device 106 do not correspond, the compensation air flow flows through the compensation air flow opening 214 into or out of the pressure compensation chamber 212.

From a separation joint between two housing portions of the housing 200, one of the housing portions has a groove which extends annularly round the metering device. The groove is orientated concentrically with respect to the metering device 104. The groove is arranged in the region of the funnel-like end of the sand container 114. A heating member 216 for the sand dispenser 100 is arranged in the groove. The groove is closed by an additional housing portion. The heating member 216 has a heating element 218 and a heat transmission element 220. The heating element 218 is a heating wire and is constructed to convert electrical energy into heat. The heating wire 218 becomes hot when electrical current flows through the heating wire 218. The heat transmission element 220 is constructed to transmit the heat from the heating element 218 to the housing 200 and to a drying air flow.

A first drying air flow channel connects a drying air flow connection at an outer face of the housing 200 to a first side of the groove facing away from the sand container 114. From a second side of the groove facing the sand container 114, at least one second drying air flow channel leads approximately parallel with the container wall of the funnel-like end of the sand container 114 to at least one drying air flow opening. The sand thereby cannot be introduced into the second drying air flow channel counter to the gravitational force in the fitted position. The drying air flow opening is arranged at the lowest location of the sand container 114 in the mixing region. The drying air flow opening is arranged with little spacing from the first pipe 204. The second drying air flow channel is directed toward the first pipe 204.

When the drying air flow is provided via the drying air flow connection, it flows through the first drying air flow channel to the heating member 216. When the heating element 218 is operational, the drying air flow takes up thermal energy from the heating member 216. From the heating member 216, the drying air flow flows through the second drying air flow channel to the drying air flow opening into the mixing region.

When the metering device 104 is operational and draws fluidized sand from the mixing region, then the drying air flow replaces at least partially the secondary air flow which is reduced accordingly to obtain compensated pressure conditions. The warm drying air flow now heats and/or dries the metering device 104, the decoupling device 108 and consequently also the conveying device 106.

When the metering device 104 is not operational, the drying air flow flows partially from the mixing region into the sand container 114, where it heats and/or dries the sand. The sand thereby remains pourable and operational reliability of the sand dispenser 100 is increased. Another portion flows through the secondary air flow channel into the environment, wherein the secondary air flow channel is heated and/or dried.

A portion can also flow through the first pipe 204 and further through the compensation air flow opening 214 and through the second pipe 210 and the sand directing hose, wherein they are heated and/or dried.

In at least one disclosed embodiment, the heat transmission element 220 has a base member comprising an elastomer material which surrounds the heating wire 218. In the non-fitted state, the heating member 216 is narrower than the groove. In this instance, the heating member 216 has a greater height in the relaxed state than the groove is deep. As a result of the width being smaller than the groove, the heating member 216 can be readily inserted in the groove. When the housing portions are joined together, the elastomer material is compressed, whereby the height of the heating member 216 is adapted to the depth of the groove. In this instance, the width of the heating member 216 is increased, whereby the heat transmission element 220 receives direct contact with respect to the housing 200. As a result of the direct contact, a good heat transmission from the heat transmission element 220 to the housing 200 becomes possible. When the heating member 216 is operational, without the drying air flow being provided, the thermal energy is primarily transmitted to the housing 200 which is thereby heated.

In a disclosed embodiment, the heat transmission element 220 has a structure for providing a heat transmission face with respect to the drying air flow and a contact face with respect to the housing 200. The heat transmission face and the contact face are in a predetermined surface-area ratio. The heat transmission face for the drying air flow is formed by a helical rib which extends along a first side of the heating member 216. The rib is formed from the elastomer material and adjoins a first lateral face of the groove and thus seals adjacent turns of the resultant drying air flow channel with respect to each other. The drying air flow is guided by the rib in a helical manner along the heating member 216, whereby a long travel path is produced for receiving the thermal energy. A second side of the heating member 216 has a corrugated surface structure. The surface structure adjoins a second lateral face of the groove. As a result of the corrugated surface structure, the contact face with respect to the housing 200 is reduced in comparison with a smooth surface. The heat transmission face is substantially greater than the contact face to take into account the different heat transmission coefficients from the heating member 216 to the drying air flow and the heating member 216 to the housing 200.

In the embodiment illustrated, the rib is directed in the direction of the metering device 104. The corrugated surface is directed away from the metering device 104.

In a disclosed embodiment not shown, the corrugated surface is directed in the direction of the metering device 104. The rib is directed away from the metering device 104.

In a disclosed embodiment, the elastomer material is provided with two filler materials. The first filler material is constructed to increase a thermal conductivity of the elastomer material. The second filler material is constructed to reduce the thermal conductivity of the elastomer material. At the heat transmission face with respect to the drying air flow, the elastomer material is provided with the first filler material which is constructed to increase the thermal conductivity of the elastomer material. At the contact face with respect to the housing 200, the elastomer is provided with the second filler material which is constructed to reduce the thermal conductivity of the elastomer material.

In a disclosed embodiment, the metering member 104 comprises the main elements housing 200, ejector pipe 204, intake 206, secondary air supply lines 208, of which only one is illustrated in a simplified manner, and an air connection and an integrated heating member 216 inside a heating chamber, the associated oblique holes, of which only one is illustrated in a simplified manner, and the connection for the drying air flow.

In a disclosed embodiment, the conveying member 106 comprises the main elements housing 200, pressure compensation chamber 212, compensation air flow openings 214, of which only one is illustrated in a simplified manner, manifold, ejector pipe 210, hose connection piece and an air connection.

In the embodiment illustrated, the housing 200 of the metering member 106 is connected to the storage container 114 so that, together with the dispensing funnel, the storage container 114 can be completely emptied via the device 100 and a uniform sand flow is achieved.

In the embodiment illustrated, the metering member 104 is connected to the conveying member 106 via an interface between the lower end of the ejector pipe 204 and the pressure compensation chamber 212.

In a disclosed embodiment, the pressure compensation chamber 212 is formed at the base as a dispensing funnel so that the sand cannot remain in the pressure compensation chamber 212.

In a disclosed embodiment, the secondary air flow opening 208 and the compensation air flow opening 214 are both protected from external contaminations and the introduction of water by the air channels thereof which are directed downward and a protective plate which is retained by a spacer member.

The sand directing hose is connected to the device 100 via the hose connection piece.

During operation, the sand stored in the storage container 114 is prevented from automatically being discharged by the form of the intake 206. Furthermore, the oblique holes for the drying air flow and the secondary air flow prevent the sand from being introduced into the air channels and the heating chamber.

By a metering air flow being applied to the metering air flow connection, a reduced pressure and consequently an air flow through the ejector pipe 204 is produced by the ejector holes 202 in the upper portion of the ejector pipe 204. The reduced pressure and the air flow draw in the sand and lift it above the potential barrier formed by the intake 206 and the ejector pipe 204. In this instance, a secondary air flow is drawn in via the hole. Consequently, the sand is metered in the first two-phase flow in accordance with the strength of the metering air flow and independently of the sealing of the storage container 114, and is introduced into the pressure compensation chamber 212. The sand stream expands slightly in the pressure compensation chamber 212 and the sand flows further into the manifold as a result of the mass inertia thereof. In this instance, since the sand is braked only slightly, the kinetic energy thereof can be used for the continued conveying thereof within the third two-phase flow. In this case, a compensation air flow is formed in such a manner that the pressure compensation chamber 212 has ambient pressure, and thus prevents a retroaction on the sand quantity in the two-phase flows. Sand which does not arrive in the manifold as a result of the stochastic behavior is also directed into the manifold by the dispensing funnel. Very light sand portions can be introduced directly into the hole of the compensation air flow channel and onward into the open air in an unused state without any risk of blockage.

As a result of the application of a conveying air flow to the conveying air flow connection at the same time as the metering air flow, a reduced pressure is produced by the ejector holes 202 in the right-hand portion of the ejector pipe 210, and consequently an air flow through the ejector pipe 210. The secondary air drawn in here is provided by a portion of the compensation air flow which flows through the hole 214. The compensation air flow can flow in or out of the pressure compensation chamber 212 in accordance with the operating location. The operating location is dependent on the metering air flow, conveying air flow, resistance of the sand directing hose and/or the active cross-section of the sand. The compensation air flow is a superimposition of the air portion of the second two-phase flow with the additionally required or excessively present secondary air flow for the conveying member 106. The air flow present in the ejector pipe 210 further conveys the sand through the sand hose, which is connected to the ejector pipe 210 via the connection piece, between the wheel and the rail.

After the metering air flow is switched off, the sand still present in the sand directing hose is conveyed by the still active conveying air flow out of the sand directing hose without sand from the storage container 114 being metered. The conveying air flow is not switched off until after the sand directing hose has been completely emptied.

A device 100 for metering and conveying sand 116 for sand scattering systems in rail vehicles is characterized in that the pneumatic metering member 104 and the pneumatic conveying member 106 are decoupled by a pressure compensation chamber 212 with a compensation air flow opening 214 being connected.

In the lower region of the dispensing funnel, there are provided oblique holes in the housing 200 for the secondary air flow of the metering member 104.

The metering member 104 is produced by an ejector pipe 204 with ejector holes 202.

The conveying member 106 is produced by an ejector pipe 210 with ejector holes 202.

In a disclosed embodiment, a residue-free emptying of the sand container 114 is brought about by a correspondingly formed dispensing funnel which is part of the device 100.

There are provided in the dispensing funnel oblique holes in the housing 200 for the drying air and a heating member 216 for heating the drying air flow and the housing 200.

The heating member 216 has a helical structure which guides the drying air from the drying air connection to the oblique holes inside the heating chamber and consequently discharges the heat uniformly to the drying air.

The heat transmission coefficients of the heating member 216 to the drying air and the heating member 216 to the housing 200 are so different that the heat is optimally distributed over the drying air and the housing 200.

In a disclosed embodiment, the different heat transmission coefficients are produced by differently thermally conductive materials.

In a disclosed embodiment, the different heat transmission coefficients are produced by different thermal surface contacts.

The oblique holes in the housing 200 for the secondary air flow of the metering member are arranged in such a manner that the sand in this region becomes fluidized.

Figure 3:
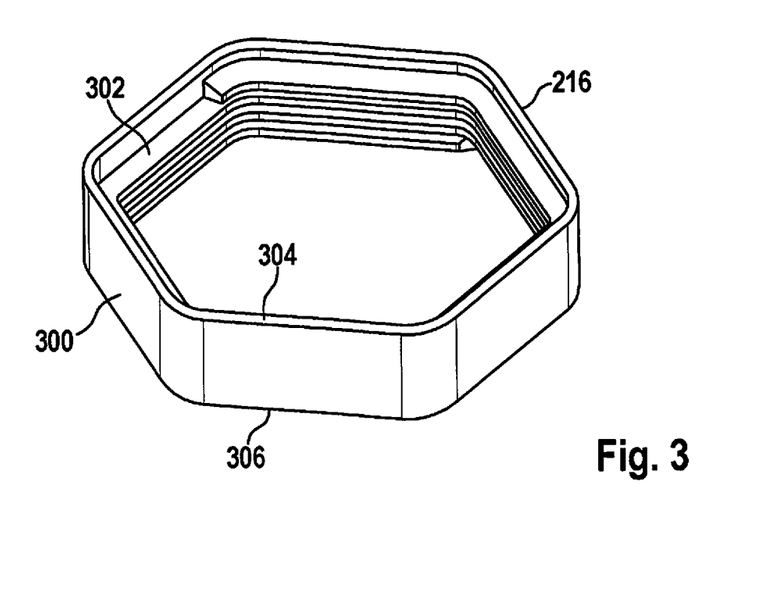
FIG. 3 illustrates a heating member according to an embodiment.

FIG. 3 illustrates a heating member 216 according to a disclosed embodiment. The heating member 216 substantially corresponds to the heating member in FIG. 2. The heating member 216 is annularly closed as in FIG. 2. The heating member 216 has an outer contour which differs from the circular form. The heating member 216 has a polygonal outer contour.

In the embodiment illustrated, the heating member 216 is constructed as a hexagonal ring 300. The hexagon has rounded edges. At an inner side of the ring 300, the helical rib 302 is arranged so as to have three complete turns so that the helical drying air flow channel is formed in the intermediate space between the turns when the heating member 216 is arranged in a correspondingly formed groove in the housing of the sand dispenser. The rib 302 has a trapezoidal cross-section. The ring 300 has an end face 304 and a lower face 306 which abut the housing when the heating member 216 is inserted in the groove and the housing portions are connected to each other.

The outer contour which is different from the circular form allows an annularly closed form of the heating member 216. In the region of the straight part-portions of the heating member 216 and/or in the region of the corners of the heating member 216, there may be arranged fixing elements, lines and/or connection elements in the housing without interrupting the heating member.

Figure 4:
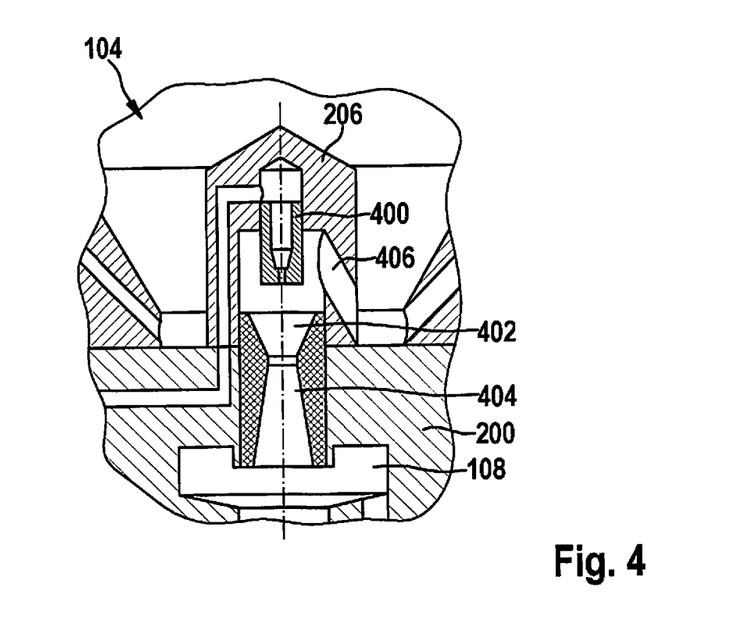
FIG. 4 illustrates a metering device for a sand dispenser according to an embodiment.

FIG. 4 illustrates a metering device 104 for a sand dispenser according to a disclosed embodiment. The metering device 104 is, as illustrated in FIG. 2, arranged in the sand dispenser. Unlike FIG. 2, the metering device 104 is constructed as an injector having an injector nozzle 400 for providing the metering air flow. The injector is constructed similarly to a jet pump. The injector nozzle 400 is orientated coaxially with respect to a collector nozzle 402 with an adjoining diffuser 404. The collector nozzle narrows in a funnel-like manner as far as a diffuser neck, at which the collector nozzle has the smallest diameter thereof. From that location, the diameter again becomes larger. When the metering air flow flows as a stream out of the injector nozzle 400, there is produced a pulsed transmission with respect to a suction medium in the collector nozzle 402. The suction medium is the first two-phase flow comprising secondary air and sand during operation of the metering device 104. The stream mixes in the collector nozzle 402 with the suction medium to form the second two-phase flow. The suction medium is drawn along into the collector nozzle 402 and accelerated in this instance. The stream widens from the injector nozzle 400 and reaches in the diffuser neck approximately the diameter of the diffuser neck. In the diffuser neck, the second two-phase flow reaches the highest speed and the lowest pressure thereof. From that location, the suction medium and the stream have the same pressure. In the diffuser 404, the second two-phase flow expands up to the end diameter of the diffuser 404. In this instance, the second two-phase flow is braked and compressed again to the pressure which is present at the end diameter. Since ambient pressure is present in the decoupling device 108, there is present in the diffuser neck a substantial reduced pressure which draws in the first two-phase flow through access holes 406 from the mixing region. The injector nozzle 400 is arranged in the intake 206 in this instance. The metering flow channel is arranged in a wall of the intake 206. The access holes 406 are arranged obliquely in the wall. In the fitted state of the sand dispenser, they are directed obliquely downward to prevent the introduction of sand into the metering device 104 when not in operation. The injector nozzle 400 and the collector nozzle 404 with the diffuser 404 are introduced into the housing 200 as in FIG. 2.

The metering member 104 illustrated in FIG. 4 substantially corresponds to the embodiment illustrated in FIG. 2. In contrast, the metering member 104 is constructed so as to have a jet nozzle. The metering member 104 differs from the illustration in FIG. 2 in terms of the elements injector nozzle 400 with diffuser 404, intake 206 with oblique holes, of which only one is illustrated in a simplified manner, and the supply of the metering air flow. The housing 200 is accordingly adapted to the air guide with respect to FIG. 2. All the other positions are identical to the positions of the embodiment in FIG. 2. The metering member 104 is produced by an injector nozzle 400 with a diffuser 404.

In functional terms, there is produced a difference with respect to the embodiment in FIG. 2. By the metering air flow being applied to the supply by the injector nozzle 400 above the diffuser 404, there is produced a reduced pressure and consequently an air flow through the diffuser 404. The reduced pressure and the air flow draw in the sand and lift it above the potential barrier formed by the oblique holes.

Figure 5:
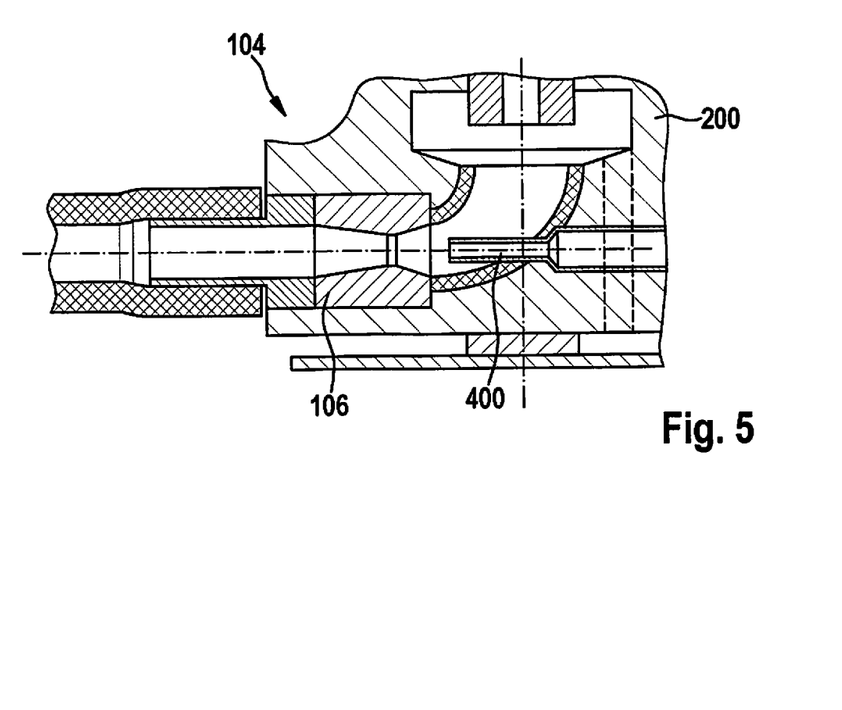
FIG. 5 illustrates a conveying device for a sand dispenser according to an embodiment.

FIG. 5 illustrates a conveying device 106 for a sand dispenser according to a disclosed embodiment. The conveying device 106 is arranged in the sand dispenser, as illustrated in FIG. 2. In contrast to FIG. 2, the conveying device 106 is constructed as an injector having an injector nozzle 400 to provide the conveying air flow. The function of the injector is as described in FIG. 4. The suction medium is in this instance the third two-phase flow described in FIG. 2. The fourth two-phase flow is produced in the injector as a result of the mixing with the conveying air flow. The injector nozzle 400 is constructed in this instance as a pipe which projects horizontally into the manifold. The conveying air flow channel extends in continuation of the injector nozzle 400 linearly relative to the lateral face of the housing 200.

The conveying member 106 illustrated in FIG. 5 substantially corresponds to the embodiment illustrated in FIG. 2. In contrast, the conveying member 106 is constructed so as to have a jet nozzle. The conveying member 106 differs from the illustration in FIG. 2 in terms of the elements housing 200, manifold and injector nozzle 400 with diffuser. The conveying member 106 is produced by an injector nozzle 400 having a diffuser.

In functional terms, there is produced a difference with respect to the embodiment in FIG. 2. By the conveying air flow being applied to the supply by the injector nozzle 400 at the same time as the metering air flow, there is produced a reduced pressure and consequently an air flow through the diffuser in the right-hand portion of the diffuser.

Figure 6:
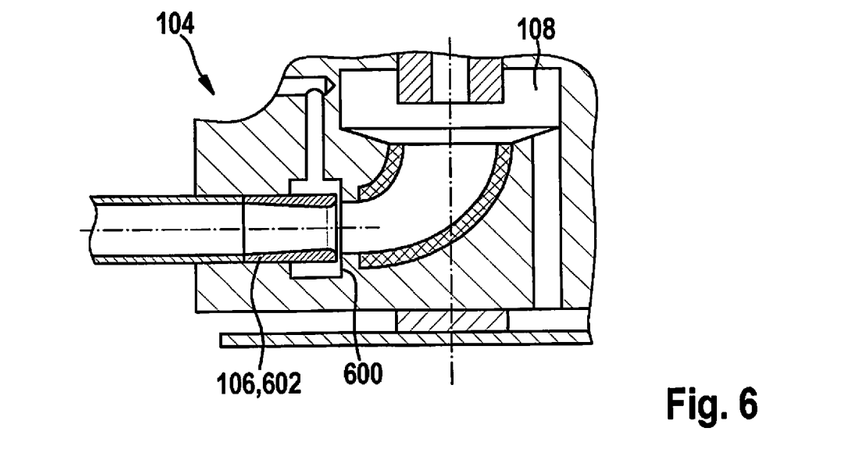
FIG. 6 illustrates a decoupling device and a conveying device for a sand dispenser according to an embodiment.

FIG. 6 illustrates a decoupling device 108 and a conveying device 106 for a sand dispenser according to a disclosed embodiment. The conveying device 106 and the decoupling device 108 are arranged in the sand dispenser, as illustrated in FIG. 2. The decoupling device 108 corresponds to the decoupling device in FIG. 2. Unlike FIG. 2, the conveying device 106 is constructed as an air amplifier having an annular gap 600 to provide the conveying air flow. The conveying air flow is discharged from the annular gap 600 at practically the speed of sound. The conveying air flow extends from the annular gap as a result of the geometry of the nozzle 602 along a wall of the nozzle 602 and expands increasingly in this instance. As in the injector in FIG. 4, the suction medium, in this case the third two-phase flow, is drawn along and accelerated, whereby the reduced pressure which draws in the third two-phase flow is produced. The conveying air flow mixes with the third two-phase flow to form the fourth two-phase flow.

In a disclosed embodiment, the metering device has an air amplifier, as illustrated in FIG. 6.

The conveying member 106 illustrated in FIG. 6 has an air amplifier. The conveying member 106 differs in terms of the elements housing 200 and the air amplifier nozzle 602. The conveying member 106 is produced by an air amplifier.

In functional terms, there is produced a difference with respect to the embodiments shown in FIGS. 2 and 4 in that, by a conveying air flow being applied to the supply at the same time as the metering air flow, there is produced on the right beside the air amplifier nozzle a reduced pressure which consequently produces an air flow which draws in the sand and which further transports it through the nozzle 602.

Figure 7:
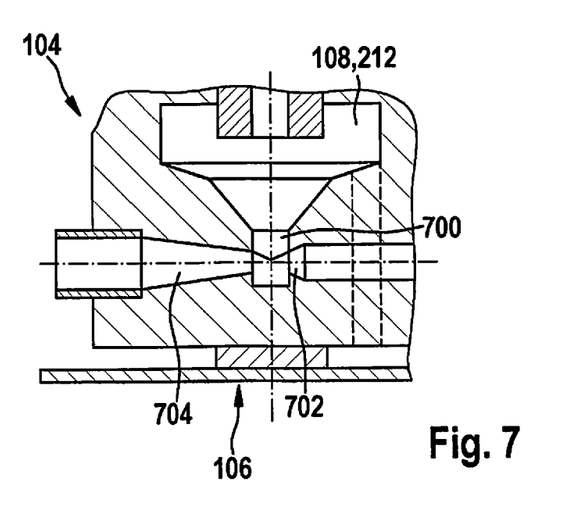
FIG. 7 illustrates a conveying device for a sand dispenser according to another embodiment.

FIG. 7 illustrates a conveying device 106 for a sand dispenser according to another disclosed embodiment. The conveying device 106 has a Venturi nozzle having at least one discharge pipe 700 for supplying the sand quantity. The Venturi nozzle comprises a nozzle 702 and a downstream diffuser 704. The nozzle 702 accelerates the conveying air flow. In this instance, the pressure in the conveying air flow decreases. The discharge pipe 700 is arranged at the transition from the nozzle 702 to the diffuser 704. The suction medium is drawn in and drawn along into the diffuser 704 as a result of the reduced pressure. The diffuser 704 opens in the connection piece for the sand directing hose. The discharge pipe 700 is directly connected to the decoupling device 108. An end of the discharge pipe 700 facing the decoupling device 108 is expanded in a funnel-like manner in addition to the chamfering at the base of the pressure compensation chamber 212 to focus the second two-phase flow being discharged from the metering device 104 into the narrow location of the Venturi nozzle.

The conveying member 106 illustrated in FIG. 7 has a Venturi nozzle. The conveying member 106 differs in terms of the elements housing 200 and Venturi pipe comprising inter alia the supply 700 and the diffuser 704. The conveying member 106 is produced by a Venturi pipe 602.

A functional difference with respect to the embodiments shown in FIGS. 2, 4 and 6 is produced in that, by a conveying air flow being applied to the supply at the same time as the metering air flow, there is produced in the lower portion of the dispensing funnel a reduced pressure and consequently an air flow which draws in the sand and which further transports it through the diffuser 704.

Figure 8:
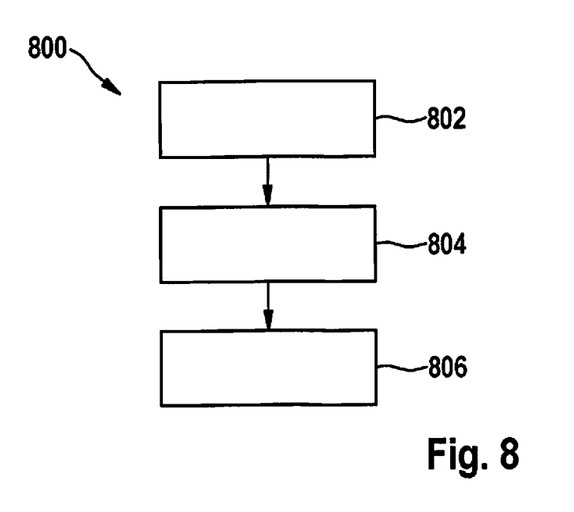
FIG. 8 is a flow chart of a method for providing sand according to an embodiment.

FIG. 8 is a flow chart of a method 800 for providing sand for a rail vehicle according to a disclosed embodiment. The method 800 begins at 802 with metering, continuing to 804 with conveying and to 806 with decoupling. At 802 of metering, a sand quantity to be scattered is metered using a metering air flow. At 804 of conveying, the sand quantity is conveyed to at least one scattering location using a conveying air flow. At 806 of decoupling, an outlet air flow of the metering device and an inlet air flow of the conveying device are decoupled using a compensation air flow. In this instance, the compensation air flow is provided to compensate for a difference between the outlet air flow and the inlet air flow.

The method 800 shown in FIG. 8 for metering and conveying sand for sand scattering systems in rail vehicles is characterized by a purely pneumatic metering and conveying action, wherein the metering member and the conveying member are decoupled from each other by a compensation air flow.

The embodiments described are selected merely by way of example and may be combined with each other.

EP2311653 describes a sanding device for a rail vehicle.

LIST OF REFERENCE NUMERALS

100 Sand dispenser
102 Rail vehicle
104 Metering device, metering member
106 Conveying device, conveying member
108 Decoupling device
110 Metering air flow
112 Secondary air flow
114 Sand container, storage container
116 Sand
118 First two-phase flow air/sand from storage container to metering member
120 Second two-phase flow air/sand from metering member to compensation opening
122 Outlet air flow
124 Conveying air flow
126 Scattering location
128 Wheel
130 Rail
132 Third two-phase flow air/sand from compensation opening to conveying member
134 Inlet air flow
136 Fourth two-phase flow air/sand from conveying member through sand directing hose to location between wheel and rail
138 Compensation air flow
200 Housing
202 Ejector holes
204 First pipe, ejector pipe of metering member
206 Intake of metering member
208 Secondary air flow opening
210 Second pipe, ejector pipe of conveying member
212 Pressure compensation chamber
214 Compensation air flow opening
216 Heating member
218 Heating element
220 Heat transmission element
300 Ring
302 Rib 304 End face
306 Lower face
400 Injector nozzle of metering member or conveying member
402 Collector nozzle
404 Diffuser of metering member
406 Access hole, oblique hole for drawing in sand
600 Annular gap
602 Nozzle
700 Discharge pipe
702 Nozzle
704 Diffuser
800 Method for providing sand
802 Metering
804 Conveying
806 Decoupling

The invention claimed is:

1. A sand dispenser for a rail vehicle, the sand dispenser comprising:
    a metering device for pneumatically metering a desired sand quantity using a metering air flow;
    a conveying device for pneumatically conveying the sand quantity to at least one scattering location using a conveying air flow; and
    a decoupling device for pneumatically decoupling the metering device and the conveying device,
    wherein the decoupling device is constructed to provide a compensation air flow for compensating for a difference between an outlet air flow of the metering device and an inlet air flow of the conveying device, and
    wherein the decoupling device has a pressure compensation chamber for coupling the compensation air flow, wherein the pressure compensation chamber is arranged in a connection line between the metering device and the conveying device.

2. The sand dispenser of claim 1, wherein the decoupling device has a base which is constructed obliquely in the direction toward the conveying device to prevent sand deposits in the decoupling device.

3. The sand dispenser of claim 1, wherein the decoupling device has at least one compensation air flow opening with respect to an environment for the compensation air flow.

4. The sand dispenser of claim 1, wherein the metering device and/or the conveying device has/have an ejector having at least one ejector hole for providing the metering air flow and/or the conveying air flow.

5. The sand dispenser of claim 1, wherein the metering device and/or the conveying device has/have an injector having at least one injector nozzle for providing the metering air flow and/or the conveying air flow.

6. The sand dispenser of claim 1, wherein the metering device and/or the conveying device has/have an air amplifier having at least one annular gap for providing the metering air flow and/or the conveying air flow.

7. The sand dispenser of claim 1, wherein the metering device and/or the conveying device has/have a Venturi nozzle having at least one discharge pipe for supplying the sand quantity.

8. The sand dispenser of claim 1, wherein the metering device has at least one secondary air flow opening to an environment, wherein the secondary air flow opening is arranged adjacent to an inlet opening of the metering device and is constructed to provide a secondary air flow for fluidizing sand in the region of the inlet opening when the metering air flow flows through the metering device.

9. The sand dispenser of claim 8, wherein the secondary air flow opening is constructed in the region of the inlet opening as an oblique hole.

10. The sand dispenser of claim 1, wherein the metering device has an intake above an inlet opening, wherein the intake is constructed to prevent the introduction of sand into the metering device in the absence of the metering air flow.

11. The sand dispenser of claim 1, wherein the metering device has a dispensing funnel, wherein the sand container can be emptied without any residue by the metering device.

12. The sand dispenser of claim 11, wherein holes for the drying air flow are constructed as oblique holes in the dispensing funnel.

13. The sand dispenser of claim 1, having a heating member which has a heating element and a heat transmission element, wherein the heating element is constructed to convert electrical energy into heat and the heat transmission element is constructed to transmit the heat from the heating element to a housing of the sand dispenser and a drying air flow.

14. The sand dispenser of claim 1, wherein the housing is constructed in multiple portions, wherein there is arranged, in a first housing portion, a groove which extends round the metering device and in which the heating member is arranged, wherein the groove is closed by a second housing portion.

15. The sand dispenser of claim 14, wherein the groove has a polygonal extent.

16. The sand dispenser of claim 14, wherein the groove has a depth and the heating member has a height in a relaxed state greater than a depth and the heating member is compressed by the second housing portion in a fitted state.

17. The sand dispenser of claim 14, wherein the heat transmission element has a structure for providing a heat transmission face with respect to the drying air flow and a contact face with respect to the housing, wherein the heat transmission face and the contact face are in a predetermined surface-area ratio.

18. The sand dispenser of claim 14, wherein the heat transmission element has a base member which comprises an elastomer material and which surrounds the heating element.

19. The sand dispenser of claim 18, wherein the elastomer material is provided with at least one filler material, wherein the filler material is constructed to change a thermal conductivity of the elastomer material.

20. The sand dispenser of claim 18, wherein the elastomer material is provided at a heat transmission face with respect to the drying air flow with a filler material which is constructed to increase the thermal conductivity of the elastomer material and/or the elastomer material is provided at a contact face with respect to the housing with a filler material which is constructed to reduce the thermal conductivity of the elastomer material.

21. A method for providing sand for a rail vehicle, wherein the method comprises:
    a metering device metering a desired sand quantity using a metering air flow;
    a conveying device conveying the sand quantity to at least one scattering location using a conveying air flow; and
    a decoupling device decoupling an outlet air flow of the metering device and an inlet air flow of the conveying device using a compensation air flow for compensating for a difference between the outlet air flow and the inlet air flow,
    wherein the decoupling device has a pressure compensation chamber, and the method further comprises the pressure compensation chamber coupling the compensation air flow, wherein the pressure compensation chamber is arranged in a connection line between the metering device and the conveying device.

\* \* \* \* \*